United States Patent [19]

Brooks

[11] 4,206,501
[45] Jun. 3, 1980

[54] APPARATUS AND METHODS FOR BACK ILLUMINATING A DISPLAY SURFACE

[75] Inventor: David L. Brooks, Streamwood, Ill.

[73] Assignee: Motorola, Inc., Schaumburg, Ill.

[21] Appl. No.: 915,040

[22] Filed: Jun. 12, 1978

[51] Int. Cl.² .......................... F21V 9/00; G02F 1/13; F21V 3/00; F21V 5/00
[52] U.S. Cl. .................................. 362/293; 350/345; 350/351; 362/311
[58] Field of Search ........................ 362/2, 4, 311, 293, 362/26, 27, 31, 32; 350/338, 339, 345, 349, 351, 311, 314; 355/18, 113, 1, 67, 71, 79, 80; 96/67

[56] References Cited

U.S. PATENT DOCUMENTS

| | | | |
|---|---|---|---|
| 3,602,590 | 8/1971 | Lukens | 355/79 |
| 4,118,111 | 10/1978 | Laesser | 350/345 |
| 4,132,464 | 1/1979 | Maeno | 350/351 |

FOREIGN PATENT DOCUMENTS 51-11879  2/1976  Japan .

Primary Examiner—Samuel W. Engle
Assistant Examiner—Donald P. Walsh
Attorney, Agent, or Firm—Rolland R. Hackbart; James W. Gillman

[57] ABSTRACT

An apparatus for back lighting a display surface of a liquid crystal display includes a light source and a diffusing backplate interposed between the light source and the display. The diffusing backplate is selectively darkened to attenuate light rays from the light source to provide substantially uniform back illumination of the display. The diffusing backplate further includes a plurality of heating resistors and a thermistor for maintaining the temperature of the display above a predetermined minimum temperature.

8 Claims, 2 Drawing Figures

APPARATUS AND METHODS FOR BACK ILLUMINATING A DISPLAY SURFACE

TECHNICAL FIELD

The present invention relates to the illumination of a display surface, and more particularly, to an improved apparatus and method for evenly back illuminating a display surface.

BACKGROUND ART

Back lighting of a display surface has been typically accomplished by using a reflecting light box having a light source positioned behind the display surface. The distance of the light source from a display surface is critical in order to avoid hot spots which are observable bright spots caused by the light source. However, due to physical restrictions, the space for a light box is not always available.

Space restrictions have been accommodated to some degree by utilizing light piping and wedge lighting. According to light piping techniques, light rays from a light source are conducted by light pipes to the display surface. Light piping techniques are illustrated in U.S. Pat. Nos. 3,632,938 and 3,718,814. According to wedge lighting, an acrylic wedge that is edge lit by a light source, is placed behind the display surface. Wedge lighting techniques are illustrated in U.S. Pat. No. 3,617,727. Although size reductions can be obtained by using light piping and wedge lighting techniques, these techniques do not eliminate hot spots while still brightly lighting the display surface under high ambient light conditions.

SUMMARY OF THE INVENTION

It is a general object of the present invention to provide an improved apparatus and method for evenly back illuminating a display surface.

It is another object of the present invention to provide an apparatus for evenly back illuminating and temperature compensating a display surface.

It is a further object of the present invention to provide an improved apparatus and method for evenly back illuminating a display surface that is lit from a single point light source or multiple single point light sources.

It is yet a further object of the present invention to provide an improved apparatus for back illuminating a display surface that is relatively compact and inexpensive.

In practicing the invention, a display surface is illuminated by back lighting from a light source. A predeterminedly exposed negative photographic film is interposed between the light source and the display surface for selectively attenuating concentrated light rays from the light source to provide substantially uniform back illumination of the display surface. The negative is selectively darkened for attenuating the light rays in proportion to the relative light intensity on the surface thereof. A diffusing backplate may be further interposed between the negative and the display surface for diffusing the attentuated light rays. The negative may be eliminated if the diffusing backplate is predeterminedly coated with an opaque substance to provide substantially the same light attenuation as the negative.

The present invention further encompasses a method for back illuminating a display surface comprising the steps of exposing a negative to a light source to provide a shadow mask that is selectively darkened to attenuate light rays from the light source in proportion to the relative light intensity on the surface thereof, and interposing the exposed negative between the light source and the display surface for providing substantially uniform back illumination of the display surface.

DETAILED DESCRIPTION OF THE INVENTION

Figure 1:
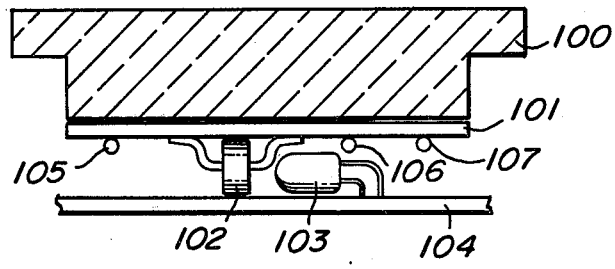
FIG. 1 is a end view of an embodiment of the illumination apparatus of the present invention for illuminating the display surface of a liquid crystal display.

In FIG. 1, there is illustrated an embodiment of the present invention advantageously adapted for back illuminating the display surface of a transmissive or transflective liquid crystal display 100. A diffusing backplate 101 is interposed between a miniature light bulb 103 and the display 100. The diffusing backplate 101 not only diffuses but also selectively attenuates incident light rays from the bulb 103 so that a substantially uniform intensity of light is applied over the entire display 100. Since it is desired that the entire apparatus be as compact as possible, the bulb 103 is very closely placed to the diffusing backplate 101.

Since the bulb 103 is located so close to the diffusing backplate 101, hot spots will tend to be created in the portions of the display 100 closest to the bulb 103. However, hot spots are essentially eliminated by the present invention while still taking advantage of the benefits of back lighting.

Figure 2:
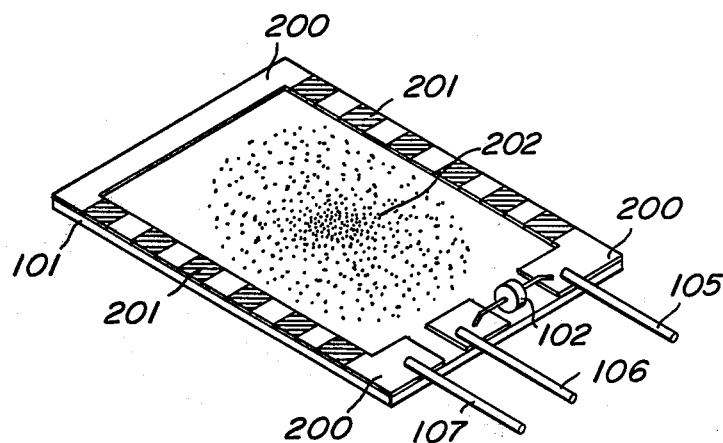
FIG. 2 is a perspective view of a diffusing backplate for a display surface embodying the present invention.

The inventive features of the present invention can be more clearly apprehended by referring to the perspective view of the diffusing backplate in FIG. 2. The diffusing backplate 101 is selectively darkened 202 to attenuate light rays from the light source in proportion to the relative light intensity incident on the surface thereof. The diffusing backplate 101 can be screened to provide the selective darkening. The light intensity from the bulb 103 varies from a relatively high intensity near the center of the backplate 101 to a relatively low intensity near the edges of the backplate 101. The light intensity gradient over the surface of the backplate 101 can be captured on continuous tone photographic film, since a photographic negative is a direct inverse of the light intensity gradient. Thus where the light intensity is greatest, the negative is darkest and vice versa. Therefore, the negative may be exposed so that near the edge of the back 101 there is only slight darkening and near the center of the backplate 101 there is substantially greater darkening, such that a shadow mask is created. The exposed negative may then be interposed directly between the bulb 103 and a display 100, eliminating the diffusing backplate 101, or alternatively, the exposed negative may be interposed between the bulb 103 and the diffusing backplate 101.

Furthermore, the diffusing backplate 101 may be screened to be selectively darkened in accordance with the exposed negative. A screening process similar to that utilized for screening hybrid conductors and resistors may be used to screen the diffusing backplate 101, which may be comprised of any suitable material such as alumina. Alumina is a white translucent even density diffuser that is advantageously suited for use as the diffusing backplate 101. In order to screen the alumina backplate, a half tone negative is created from the exposed negative. The half tone process converts the intensity gradient of the exposed negative into a gradient of dots. Where the exposed negative is dense, the half tone negative has many dots that are closely spaced, and vice versa. The half tone negative is an acceptable reproduction of the exposed negative. The grouping of dots from the half tone negative may then be screened in ink on the alumina backplate 101. The screened alumina backplate 101 is then fired in an oven to permanently fix the ink to the backplate. Once fired, the alumina backplate 101 is environmentally inert and highly resistant to fading, chipping or peeling.

The alumina backplate 101 is then interposed between the bulb 103 and the display 100 for selectively attenuating the light rays from the bulb 103 to provide substantially uniform back illumination of the display 100. The present invention may be advantageously applied to any display surface where substantially uniform back illumination is desired. Back lighting is preferable over other methods of illumination since the illuminated surface is brightly lighted even under high ambient light conditions.

The diffusing backplate 101 of FIG. 2 further includes a plurality of heating resistors 201. The heating resistors 201 may be deposited as thick film ink resistors. The thick film resistors 201 are interconnected by plating 200 and are accessible via leads 105, 106 and 107. A thermistor 102 is provided between leads 105 and 106 for sensing the temperature of the diffusing backplate 101. A control circuit, as is known in the art, is connected to leads 105, 106 and 107 for maintaining the diffusing backplate 101 at a predetermined temperature. The alumina backplate 101 may be held against, and thus thermally coupled to, the display 100 for maintaining the temperature of the display 100 over a wide range of operating conditions. For example, a liquid crystal display has a lower operational temperature limit of approximately −10° C. Thus when using a liquid crystal display in a mobile radio which has an lower operational temperature limit of −30° C., it is necessary to maintain the temperature of the liquid crystal display at −10° C. or above. Thus, the control circuit may enable heating by the resistors 201 when a temperature of −10° C. is sensed by the thermistor 102. The heating resistors 201, being distributed about the periphery of the diffusing backplate 101, provide for even heating of the display 100. Thus, the diffusing backplate not only provides for even back lighting, but also maintains the temperature of the display 100 above a predetermined minimum temperature.

I claim:

1. An illumination apparatus for back illuminating a liquid crystal display surface, comprising:
   a light source for radiating a plurality of divergent light rays; and
   diffusing means comprising exposed negative photographic film interposed between the light source and the display surface, said diffusing means having at least one surface that is predeterminedly coated with an opaque substance for selectively attenuating light rays from the light source in proportion to the relative light intensity incident on the surface of the diffusing means to provide substantially uniform back illumination of the display surface.

2. The illumination apparatus according to claim 1, wherein the diffusing means is an alumina backplate and the light source is a lamp; and the display surface, alumina backplate and lamp are maintained, respectively, in substantially contiguous spatial relationship.

3. An illumination apparatus for back illuminating a liquid crystal display surface comprising:
   a light source for radiating a plurality of divergent light rays;
   diffusing means comprising exposed negative photographic film interposed between the light source and the display surface, the diffusing means having at least one surface that is predeterminedly coated with an opaque substance for selectively attenuating light rays in proportion to the relative light intensity incident on the surface of the diffusing means to provide substantially uniform back illumination of the display surface;
   thermistor means for sensing the temperature of the diffusing means and providing an output signal when the temperature of the diffusing means is less than a predetermined minimum temperature; and
   heating resistor means disposed on the periphery of the diffusing means for applying heat to the display surface in response to the output signal from the thermistor means.

4. A method for back illuminating a liquid crystal display surface with a light source providing divergent light rays, said method comprising the steps of:
   exposing a negative photographic film to the light source to provide a shadow mask that is selectively darkened in proportion to the relative light intensity incident on the surface of the film; and
   interposing the exposed film between the light source and the display surface for providing substantially uniform back illumination of the display surface.

5. The method according to claim 4 further including the steps of exposing a half tone negative photographic film in accordance with the exposed negative film and screening a light attenuating substance on the surface of a diffusing backplate in accordance with the exposed half tone film; and wherein said interposing step comprises interposing the screened diffusing backplate between the light source and the display surface.

6. The method according to claim 4 or 5 for back illuminating the display surface of a liquid crystal display.

7. The illumination apparatus according to claim 3, wherein the resistor means includes a plurality of thick film resistors deposited around the periphery of the diffusing means.

8. The illumination apparatus according to claim 3, wherein the diffusing means is a translucent alumina backplate and the light source is a lamp; and the display surface, alumina backplate and lamp are maintained in substantially contiguous spatial relationship.

* * * * *